US009032230B2

(12) United States Patent
Kuroko

(10) Patent No.: US 9,032,230 B2
(45) Date of Patent: May 12, 2015

(54) INFORMATION PROCESSING APPARATUS, POWER SAVING CONTROL METHOD, AND STORAGE MEDIUM

(75) Inventor: Takehito Kuroko, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 527 days.

(21) Appl. No.: 13/421,238

(22) Filed: Mar. 15, 2012

(65) Prior Publication Data

US 2012/0239953 A1    Sep. 20, 2012

(30) Foreign Application Priority Data

Mar. 17, 2011   (JP) .................................. 2011-058715
Feb. 20, 2012   (JP) .................................. 2012-033574

(51) Int. Cl.
G06F 1/26       (2006.01)
H04N 1/00       (2006.01)
G06K 15/00      (2006.01)
G03G 15/00      (2006.01)

(52) U.S. Cl.
CPC ........ *H04N 1/00896* (2013.01); *G06K 15/4055* (2013.01); *G03G 15/5004* (2013.01); *H04N 1/00952* (2013.01); *H04N 2201/0094* (2013.01); *G03G 15/5083* (2013.01)

(58) Field of Classification Search
USPC .......................... 713/300, 310, 320, 322, 323
See application file for complete search history.

(56) References Cited

U.S. PATENT DOCUMENTS

| 7,353,412 B2* | 4/2008 | Spilker ......................... 713/320 |
| 8,176,348 B2* | 5/2012 | Fukuda ......................... 713/323 |
| 2005/0246565 A1* | 11/2005 | Koarai ......................... 713/323 |
| 2010/0257394 A1* | 10/2010 | Koga ............................ 713/324 |
| 2010/0287389 A1* | 11/2010 | Gangsto et al. ............... 713/300 |
| 2010/0313053 A1* | 12/2010 | Umezu ......................... 713/340 |
| 2011/0019218 A1* | 1/2011 | Kuwahara .................... 358/1.13 |

* cited by examiner

*Primary Examiner* — Zahid Choudhury
(74) *Attorney, Agent, or Firm* — Oblon, McClelland, Maier & Neustadt, L.L.P.

(57) ABSTRACT

An information processing apparatus has a sub system that, while a main system is in power saving state, analyzes a protocol of a network communication and recovers the main system to an ordinary power mode from the power saving state, in accordance with the protocol. There is a setting unit that sets a re-transition condition which is a condition to make the main system switch to the power saving state again, depending on a kind of the network communication. Further, there is a control unit that monitors whether the re-transition condition is satisfied and switches the main system to the power saving state in response to the re-transition condition being satisfied.

7 Claims, 11 Drawing Sheets

FIG. 7A

| PROTOCOL NAME | SUBSTITUTE RESPOND |
|---|---|
| ICMP(ICMPv2):EchoRequest(ping) | OK |
| ARP Request | OK |
| SNMP:GetRequest | OK |
| SNMP:GetRequest | OK |

FIG. 7B

| KIND OF COMMUNICATION | NECESSITY OF PROCESSING IN NCS | NECESSITY OF PROCESSING IN APPLICATION |
|---|---|---|
| PRINT JOB | YES | YES |
| SNMP | YES | NO |

FIG. 7C

| NECESSITY OF PROCESSING IN NCS | NECESSITY OF PROCESSING IN APPLICATION | NEW COMMUNICATION/ OPERATION OCCURS | RECOVERY LEVEL | RE-TRANSITION CONDITION |
|---|---|---|---|---|
| YES | NO | NO | 1 | 1MIN ELAPSE |
| YES | YES | NO | 2 | 5MIN ELAPSE |
| ⋮ | ⋮ | ⋮ | ⋮ | ⋮ |
| YES | NO | YES | MAX | 20MIN ELAPSE |

INFORMATION PROCESSING APPARATUS, POWER SAVING CONTROL METHOD, AND STORAGE MEDIUM

CROSS-REFERENCE TO RELATED APPLICATIONS

The present application claims priority to and incorporates by reference the entire contents of Japanese Patent Application No. 2011-058715 filed in Japan on Mar. 17, 2011 and Japanese Patent Application No. 2012-033574 filed in Japan on Feb. 20, 2012.

BACKGROUND OF THE INVENTION

1. Field of the Invention

The present invention relates to a power saving technique for an image processing apparatus, and more specifically relates to an image processing apparatus, a power saving control method, and a storage medium which realizes an effective power saving control.

2. Description of the Related Art

Conventionally, a technique is known that switches to a power saving mode such as a suspend to random access memory (STR) condition while idling in order to reduce power consumption of an image forming apparatus which has an electrophotographic printing system. In the STR condition, a context which is being processed by a main system is stored in random access memory (RAM), and power supplied to a device is stopped so that the device switch to the saving power condition which has a relatively low power consumption in comparison to a regular power mode.

Further, the image forming apparatus connected to a network receives various communications via the network. So a technique is known for responding to communication from the network in the power saving mode. In the technique described above, in the power saving condition, a sub system is utilized which has a lower electric power consumption, and easy packet communication response is executed by the sub system. Meanwhile, the main system switches from the power saving mode to the regular power mode so that communication which cannot be responded to by only the sub system and communications which are executed by the image forming apparatus are processed by the main system.

As an example of a background art described above, Japanese Patent Application Laid-open No. 2009-29102 (patent document 1) is aimed at enabling a packet reply in patent document 1 during the power-saving mode. It is disclosed that in the case in which a packet received from the network is a packet requiring a send back that does not need to be processed by the information processing apparatus in the power saving mode, the information processing apparatus generates a reply packet corresponding to the received packet, and sends the generated reply packet to an apparatus which sent the packet requiring a send back via the network, while maintaining the power saving mode.

SUMMARY OF THE INVENTION

However, in the background art explained above, a period while the image forming apparatus is in a regular power mode tends to be long. Thus, the power saving mode is not enough to reduce the power consumption. For effectively reducing power consumption, the inventors have determined that it is desirable to make a period of the regular mode short and make a period of the power saving mode long. Therefore, it is preferred to maintain the power saving mode while an idling time in which an operation and communication are not generated or tend to be not generated.

The idling time in which an operation and communication are not generated or tend to be not generated or not is based on a non operation time or a non-communication time. So, after the apparatus has recovered once, the apparatus remains in the regular power mode for a certain period of time until a threshold period of time elapses.

Therefore if frequent communications which need a recovery to the regular power mode occur, an efficiency of the power consumption will be reduced. Meanwhile, to avoid a frequent mode change and maintain the power saving mode for a long time, it is required to keep the threshold value on some level. Thus, by background art stated above, a period of time in a normal state is lengthened in time corresponding to the threshold value to maintain the power saving mode as long as possible. As a result, power-saving efficiency was not sufficiently improved.

The present invention was made in view of the above-described problems.

An object of the present invention is to provide an image processing apparatus, a power saving control method, and a storage medium which makes a ratio of the time of the power saving mode to the normal mode big, and improves the power-saving efficiency, depending on a kind of communication.

An information processing apparatus has a sub system that, while a main system is in power saving state, analyzes a protocol of a network communication and recovers the main system to an ordinary power mode from the power saving state, in accordance with the protocol. There is a setting unit that sets a re-transition condition which is a condition to make the main system switch to the power saving state again, depending on a kind of the network communication. Further, there is a control unit that monitors whether the re-transition condition is satisfied and switches the main system to the power saving state in response to the re-transition condition being satisfied.

The invention also includes a power saving control method in an information processing apparatus which includes a sub system which operates while a main system is in a power saving state. The method performs recovering, in response to a network communication, the main system from the power saving state, setting a re-transition condition which is a condition which causes the main system to switch to the power saving state again, depending on a type of the network communication which caused the recovery of the main system. Further, there is a determining whether the re-transition condition is satisfied, and a switching of the main system to the power saving state, when the determining determines that the re-transition condition is satisfied.

BRIEF DESCRIPTION OF THE DRAWINGS

FIG. 1 is a diagram illustrating a network environment which an image forming apparatus according to this embodiment is connected to;

FIG. 7A is a protocol list which can be processed by the sub system in substitution, and FIGS. 7B and 7C illustrate data structures for determining a recovery level.

DETAILED DESCRIPTION OF THE PREFERRED EMBODIMENTS

Hereinafter, exemplary embodiments of the present invention will be described with reference to the accompanying drawings. But, the present invention is not limited to the embodiments, and variations and modifications may be made without departing from the basic concepts of the present invention as claimed. Further, as the exemplary embodiments of the present invention, the image forming apparatus which has a plurality of functions processing images such as copy, fax, scanner, print will be described.

Figure 1:
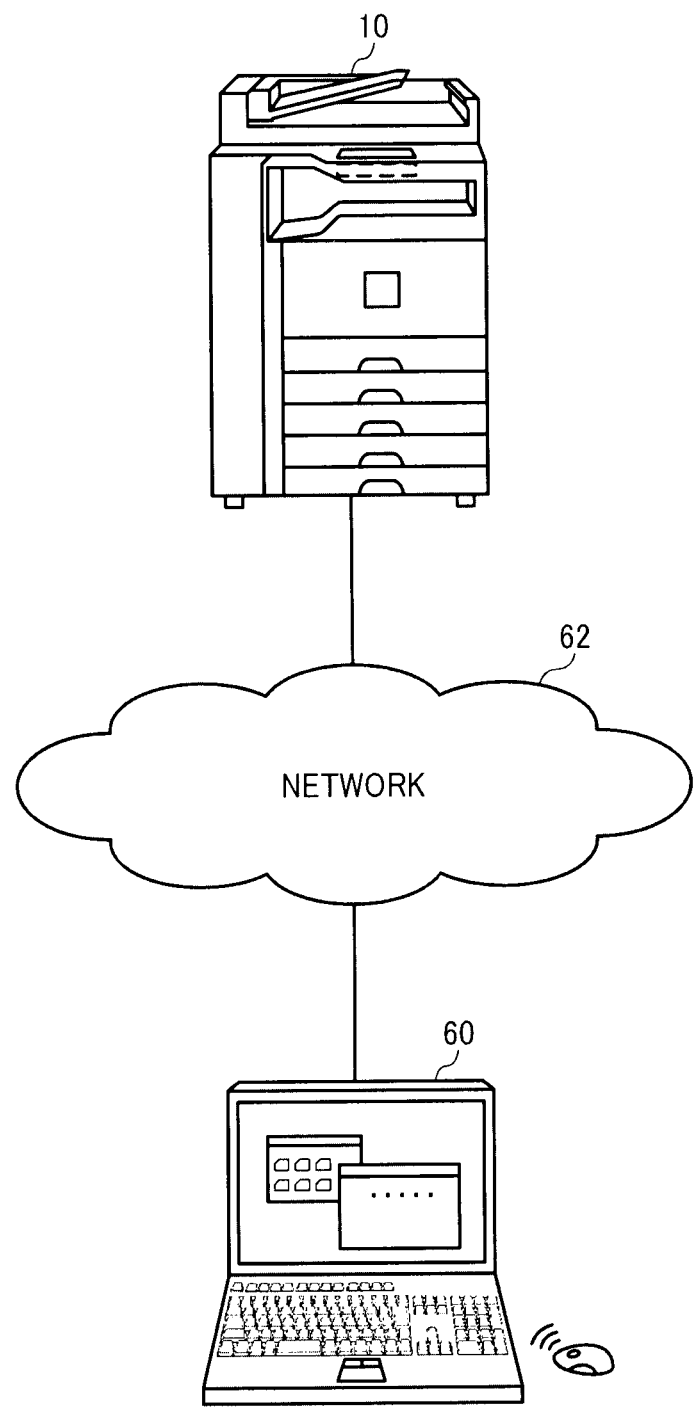

FIG. 1 is a diagram illustrating a network environment which an image forming apparatus according to this embodiment is connected to. In the network environment illustrated in FIG. 1, the image forming apparatus 10 is connected to a client computer 60 (hereinafter referred to as "client") via a network 62. The client requests a job such as a print job, a scan job and a fax sending job by sending such jobs to the image forming apparatus 10 via the network 62. The client can submit the job to the image forming apparatus 10 directly or via a print server.

The client 60 is any computer or computing device such as a desktop computer, a laptop computer, a personal digital assistance (PDA), a tablet computer, a smart phone, a digital camera and so on.

The client 60, in particular embodiment, includes a single core central processor unit (CPU), a multi core CPU, a read only memory, a random access memory which provides memory space for execution, a hard disk, and other components used in a computer. The client 60 realizes each function unit and executes each process under the control of an operating system (OS) such as Windows 7 (registered trade mark), UNIX (registered trade mark), LINUX (registered trade mark), Mac OS (registered trade mark), or any other operating system.

The network 62 is implemented as a local area network (LAN), a virtual private network (VPN), a wide area network (WAN) which is connected using a private line which uses a transaction protocol such as Ethernet (registered trade mark), transmission control protocol/internet protocol (TCP/IP), or any other desired protocol. However, the network 62 is not limited and can include use of the Internet or other public or semi-private network which is connected via a router. Further the network 62 is configured as a wired network, a wireless network, an optical network, or a mix of these networks.

The image forming apparatus 10 provides an image processing service which executes the print job, the scanner job and the fax sending job in response to a requirement of the client 60. Further the image forming apparatus 10 receives various communication packets from the client 60, a switch, the router, a gateway and an apparatus management server on the network 62.

The image forming apparatus 10 includes a sub-system which works while a main system is in a power saving state. When the image forming apparatus 10 receives the communication packet described above while the main system is in the power saving state, the image forming apparatus 10 recovers the main system corresponding to the kind of the communication and processes.

Figure 2:
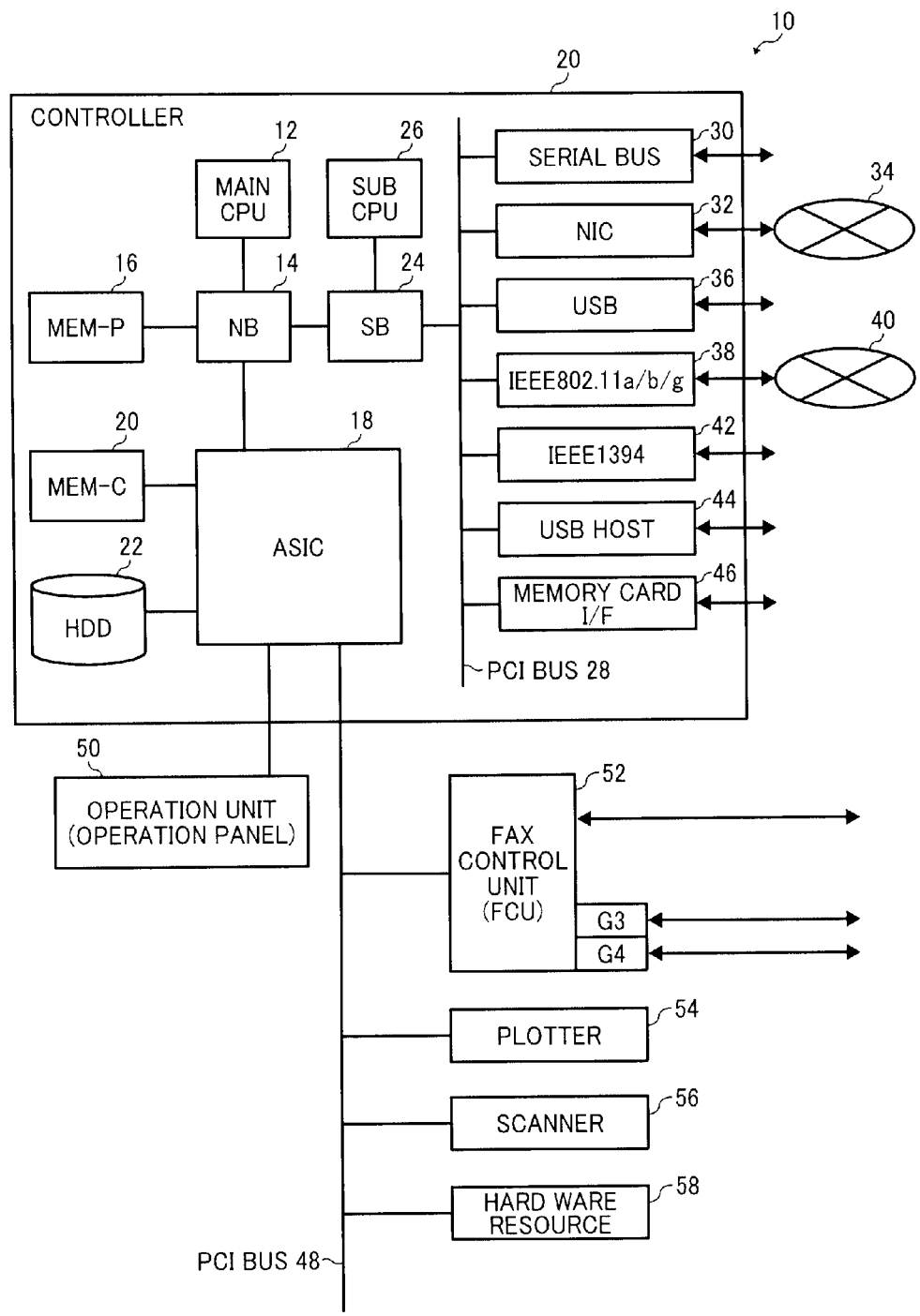
FIG. 2 is a block diagram of a hardware configuration of the image forming apparatus according to this embodiment.

FIG. 2 is a block diagram of a hardware configuration of the image forming apparatus according to this embodiment. The image forming apparatus 10 includes a controller 11, an operation panel 50, a fax control unit (FCU) 52, a plotter 54, scanner 56 and another hardware resource 58. The hardware resource can be implemented as any hardware such as a storage device, a device that inputs images, or a device that outputs images, for example. The controller 11 includes a main CPU 12, a north bridge (NB) 14, an application specific integrated circuit (ASIC) connected to the main CPU 12 via NB 14 and a system memory 16 (MEM-P). The main CPU 12 which is a processing apparatus for realizing the main system according to this embodiment will be described. The ASIC 18 is connected to NB 14 via an accelerated graphic port (AGP) or other bus/interface, and executes various image processing operations.

The ASIC 18 is connected to a local memory (MEM-C) 20, a hard disk drive (hereinafter refer to "HDD") 22 and a nonvolatile memory such as a flash memory. The local memory 20 is used as a copy image buffer and a code buffer. The HDD 22 stores image data, document data, one or more programs, font data, form data, and so on. The nonvolatile memory stores programs, various system information, and various setting information internally for controlling the image forming apparatus 10.

The controller 11 includes south bridge (SB) 24 and a sub CPU which is connected to SB-24. The sub CPU 26 is a processing apparatus for realizing the sub system according to this embodiment. And the sub CPU 26 is supplied power after the image forming apparatus 10 switches to the power saving state. The sub CPU 26 can work in a low power consumption mode, as compared with the main CPU 12. The controller 11, in addition, includes a serial bus 30, a network interface card (NIC) 32, an universal serial bus (USB) interface 36, a wireless adaptor for IEEE 802.11 a/b/g/n, and IEEE-1394 interface 42, a USB host 44 and a memory card interface 46 which are connected to NB 14 via peripheral component interconnect (PCI) bus 28.

The SB 24 is a bridge to be used for connecting a ROM and the PCI bus devices to the NB 14. The NIC 32 is an interface apparatus to be used for connecting the image forming apparatus 10 to the wired network 34 with a wired connection. The NIC 32 sends and receives various packets via the wired network 34. The wireless network adaptor 38 is an interface apparatus to be used for connecting the image forming apparatus 10 to the wireless network 40 using a wireless connection. The wireless network adaptor 38 sends and receives various packets via the wireless network 40. The serial bus 30, the USB interface 36, the IEEE-1394 interface 42, the USB host 44 and the memory card interface 46 are various interfaces that may be used with the invention. The NIC 32 and the wireless network adaptor 38, in this embodiment, are supplied power while the image forming apparatus 10 is in the power saving state. The NIC 32 and the wireless network adaptor 38 receive one or more packets which cause the image forming apparatus 10 to recover from the power saving state.

The operation panel 50 is connected to the ASIC 18 of the controller 11, accepts various inputs from an operator, and provides a user interface implemented as a screen display. The FCU 52, the plotter 54, the scanner 56 and hardware resource 58 are connected to the ASIC 18 via the PCI bus 48. The FCU 52 executes a communication process which follows a fax communication standard such as G3 or G4. The plotter 54 and the scanner 56 receive a print direction and a scan direction, and execute an image forming process and an image reading process.

Figure 3:
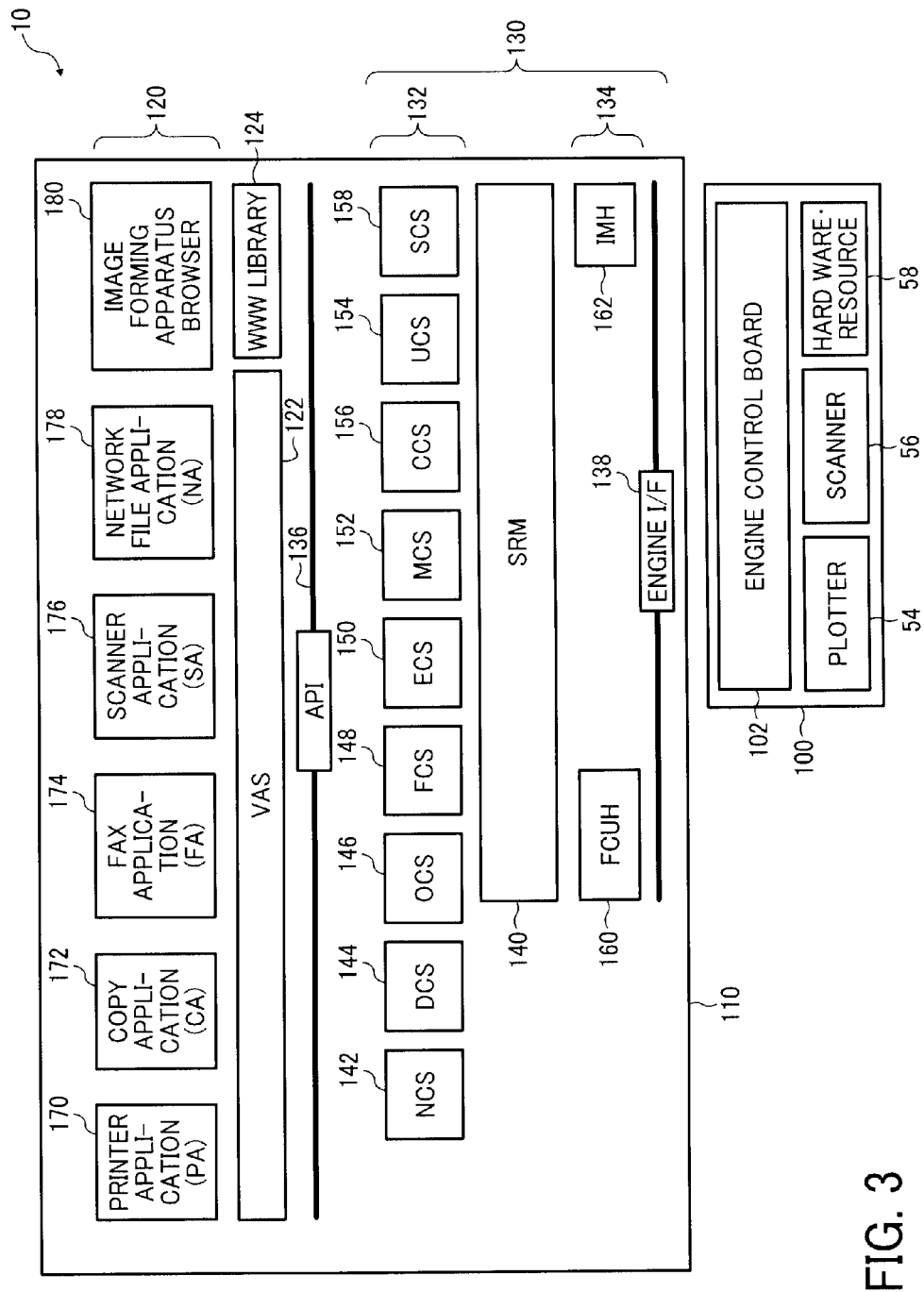
FIG. 3 is a block diagram of a software configuration and a hardware configuration of the this embodiment.

The software configuration of the image forming apparatus 10 will be described below. FIG. 3 is a block diagram of the software configuration and the hardware configuration of this embodiment. The image forming apparatus 10 illustrated in FIG. 3 includes a hardware unit 100 including various hardware resources and a software unit 110 including various software components.

The hardware unit 100 includes an engine control board 102 which controls engines such as the plotter 54 and the scanner 56 and the hardware resource 58. The software unit 110 includes an application layer 120 comprising various applications 170-180 which provide functions as the image forming apparatus, a platform layer 130 and a virtual application service (VAS) 122 which mediates between the application layer 120 and the platform layer 130.

The application layer 120 executes a process that is peculiar to user services associated with image forming such as the printer, the copy, the fax, the scanner. In the embodiment illustrated in FIG. 3, a printer application 170 providing a printer function, a copy application 172 providing a copy function, a fax application 174 providing a fax function, a scanner application 176 providing a scanner function, a network file application 178 providing a network file function and an image forming apparatus browser 180 are included. The image forming apparatus browser 180 acquires hypertext markup language (HTML) data from an external web server using world wide web (WWW) library 124 using a hypertext transfer protocol (HTTP) and display on the operation panel 50 of the image forming apparatus 10. The WWW library 124 is a dictionary, and may be a set of actions indicating how to display HTML tag code for construing or processing HTML which is received. Further, the WWW library 124 can be used for acquiring the HTML. Moreover, the WWW library includes commands for asking the server to send the HTML. Further the image forming apparatus browser 180 can interpret a script language such as Java Script (registered trademark) and controls the hardware resource of the image forming apparatus 10 based on a script described in the HTML data.

The platform layer 130 interprets, with an operating system (OS), a processing request from one or more of the applications 170-180. The platform layer 130 includes a control service layer 132 which generates an acquiring request for the hardware resource, a system resource management unit (SRM) 140, and a handler layer 134. The SRM 140 manages one or more hardware resources and controls execution by mediating the acquiring request from the control service layer 132. The handler layer 134 manages the hardware resource in response to the acquiring request from the SRM 140. UNIX (registered trademark), Windows (registered trademark), etc. can be used as the OS. The software component in software unit 110 is realized by the OS such as UNIX (registered trademark) in parallel for each process.

As shown in FIG. 3, the control service layer 132 includes a plurality of service modules, such as a network control service (NCS) 142, a delivery control service (DCS) 144, an operation panel control service (OCS) 146, a fax control service (FCS) 148, an engine control service (ECS) 150, a memory control service (MCS) 152, a certification control service (CCS) 156, a user information control service (UCS) 154, and a system control service (SCS) 158.

The SCS 158 executes a management of the applications, a control related to the user interface such as a system screen display and a light-emitting diode (LED) display, a management of the hardware resource, a control of the interrupt application and the power saving control according to this embodiment. The UCS 154 manages user information. The CCS 156 controls an authentication processing and accounting processing. The MCS 152 executes a memory control such as acquiring and releasing an image memory, compressing and decompressing the image data. The ECS 150 controls the hardware resources such as the plotter 54 and the scanner 56. Further, the ECS 150 executes an image reading and image forming, dividing jobs received from each application to a one sheet level of document and transfer paper, manages the process, controls the image reading and the image forming. The FCS 148 is connected to a general switched telephone network (GSTN) interface, controls sending and receiving the fax via the GSTN, registering and utilizing various fax data managed in backup memory, and reading faxes.

The OCS 146 controls the operation panel 50 which is an interface between an operator and the control of apparatus. The DCS 144 controls a distribution of a document stored in the HDD 22 or other memory. The NCS 142 controls the NIC 32 and the wireless network adaptor 38 connect the image forming apparatus 10 to the network, and provide services which are commonly available to applications needing network input/output. Further The NCS 142 provides data received from the network to one of the applications using at least one protocol. The NCS 142 sends data received from one of the applications to the network. Further, the NCS 142 according to this embodiment executes a determination process for realizing power saving control depend on the kind of the network communication.

An application program interface (API) 136 is between the platform layer 130 and the application layer 120. The platform layer 130 receives the processing requests from the various applications 170-180 by means of a function defined beforehand included in API 136.

The SRM 140 executes a system control and the management of the hardware resource in cooperation with the SCS 158, and determines whether the hardware resource corresponding to the acquiring request is available. The SRM 140 sends a notification indicating that the hardware resource corresponding to the acquiring request is available to an upper layer. Further, the SRM 140 manages a schedule for utilizing the hardware resource in response to the acquiring request from the upper layer. For example, the SRM 140 directly executes a paper feeding, the image forming and memory acquiring and file generation by plotter 54.

The handler layer 134 includes a fax control unit handler (FCUH) 160 and an image memory handler (IMH) 162. The FCUH 160 controls operations of the FCU 68. The IMH 162 controls operation related to memory, such as allocation or management of a memory. In an example operation, the SRM 39 and the FCUH 40 manage the hardware resource 4 via an engine I/F 54.

The image forming apparatus 10 controls the hardware resources such as the plotter 54, the scanner 56 and the HDD 22 using software. The image forming apparatus 10 provides functions such as the copy function (a color copy and a monochrome copy) and the fax function in response to an input from the external computer and a user direction via the user interface. The applications, the control services and the hardware can be implemented with various combinations. Further the applications, the control services and the hardware can be added and eliminated in correspondence to a particular purpose and a model. In this embodiment illustrated in FIG. 3, there are a platform corresponding to common part of the each application and the control service. But, the hardware configuration and software configuration of the image forming apparatus 10 is not limited to this embodiment.

Figure 4:
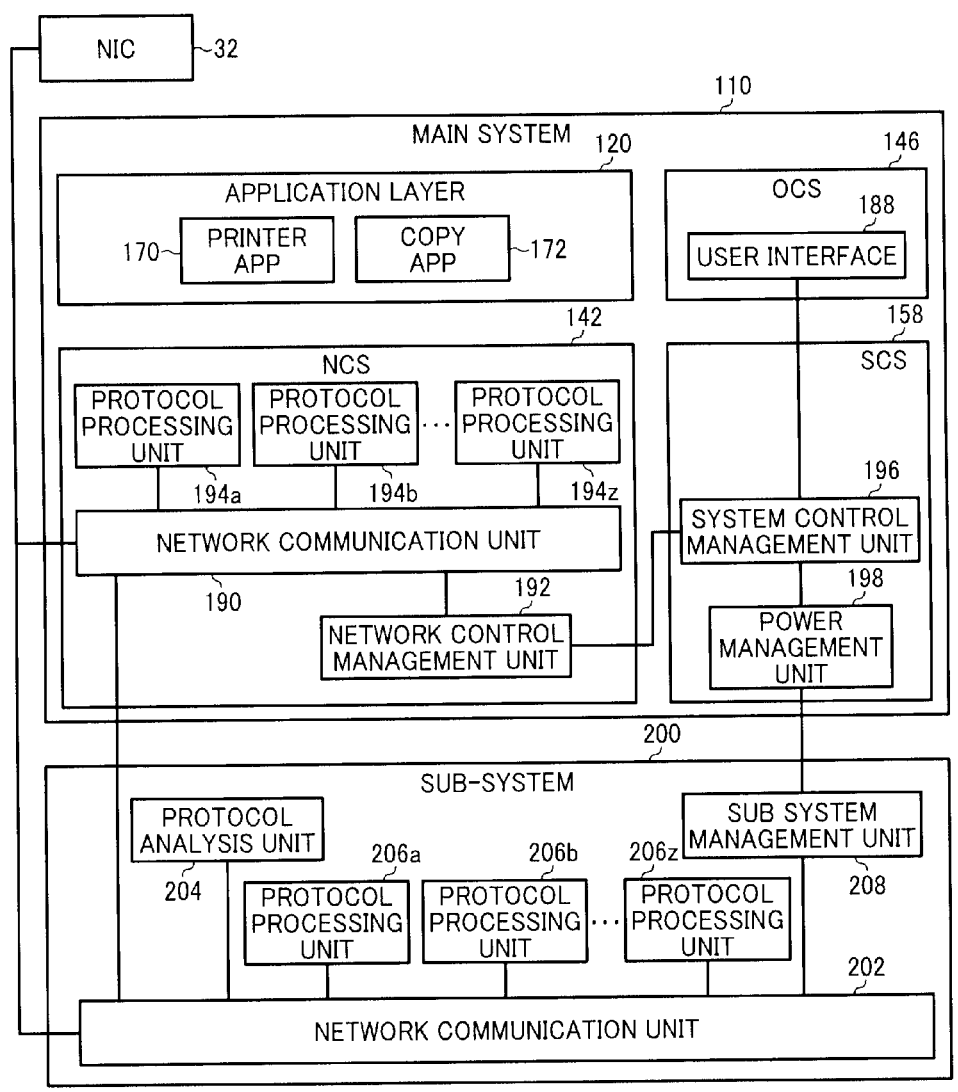
FIG. 4 is a functional block diagram relative to the power saving control.

The power saving control executed by the image forming apparatus 10 according to this embodiment will be described below. FIG. 4 is a block diagram of functions relative to the power saving control in the image forming apparatus 10 according to this embodiment. In FIG. 4, a main system 110 includes a plurality of software units, and components of the sub system are illustrated. The main system 110 is a system to provide services for the image forming apparatus which is in regular power mode.

Meanwhile, the sub system 200 responds to the communication packets sent from the network 62 instead of the main system 110, while the main system 110 is in the power saving state.

Various modes are part of the power saving state described above corresponding to a power supply state to each component of the controller 11 and to a transfer unit of the plotter 54. In this embodiment, the STR mode which stops the power supply to most components except the sub CPU 26, the NIC 32, and the wireless network adaptor 38 which are needed in the sub system 200 and stops a clock will be described. However a controller off mode which stores content in the system memory 16 in nonvolatile storage area, and stops the power supply to some unit including the system memory 16 may be utilized. Further, such storage can be applied to any power-saving mode which makes subsystem 200 act as part of the network communication.

The application layer 120, the network control service (NCS) 142, the system control service (SCS) 158, and the operation panel control service (OCS) 146 are illustrated in FIG. 4 as component related to the power saving control included in the main system 110. The application layer 120 includes applications which can respond to network communications such as the printer application 170 and the copy application 172. The operation panel control service (OCS) 146 includes a user interface 188 which accepts user operation from the operation panel 50. When the user interface 188 accepts input from the user after recovering from the power saving state, the user interface 188 sends a notification to the system control service (SCS) 158 indicating that the user interface 188 accepts the user operation.

The system control service (SCS) 158 includes a system control management unit 196 and a power management unit 198. The system control management unit 196 executes boot up and down of the main system 110. Further the system control management unit 196 according to this embodiment monitors whether a transition condition (e.g., the lapse of a predetermined period of time) for switching to the power saving state is satisfied. When the system control management unit 196 detects that the transition condition for switching to the power saving state is satisfied, the system control management unit 196 controls the system to transfer to the power saving state in response to the fact that the transition condition is satisfied. The system control management unit 196 realizes a control unit according to this embodiment. The power management unit 198 executes the power management of the main system 110.

The network control service (NCS) 142 includes a network communication unit 190, a network control management unit 192 and a plurality of a protocol processing unit 194a-194z. The network control management unit 192 boots up the network control service 142. The network communication unit 190 is a component which exchanges communication packets with the network 62. The network communication unit 190 provides the communication packets received from the network 62 to the proper protocol processing unit 194. The network communication unit 190 sends the communication packets received from the protocol processing units 194a-194z to the network. The protocol processing units 194a-194z are various protocol control programs (daemons). The protocol processing units 194a-194z receive the communication packets, execute protocol processing such as printing series (lp/ippd/centrod) file transfer series (httpd/ftpd) apparatus management series (snmpd), and responds to the network communications unit 190. Further, the network communications unit 190 responds to the client 60. Further, in this embodiment, one protocol processing unit 194 is in charge of processing for one protocol.

A network communication unit 202, a protocol analysis unit 204, a protocol processing unit 206, and a sub system management unit 208 as a component related to the power saving control are included in the sub system 200. The network communication unit 202 is a component changing a communication packet with the network 62. The network communication unit 202 requests the protocol analysis unit 204 to analyze the communication packet received from the network 62. In the case in which it is determined that the sub system 200 can substitute for the main system based on a result of analysis, the network communication unit 202 provides the communication packet to the protocol processing unit 206. Further, the network communication unit 202 sends the communication packet received from the protocol processing unit 206a-206z to the network.

The protocol analysis unit 204 receives directions from the main system 110 to register protocols (or more segmentalized communication information) to be utilized by the sub system 200. The protocol analysis unit 204 analyzes the communication packet to be directed, specifies a kind of packet, and determines whether the sub system 200 can substitute for the main system and sends the result of analysis to the network communication unit 202. The protocol processing unit 206 includes various protocol control programs (daemons) and is similar to the main system 110. The protocol processing unit 206 executes the protocol processing in response to the request received from the network communication unit 202 and responds. The sub system management unit 208 boots up and down the sub system 200, and sends power-on request to the main system 110.

As described above, when the image forming apparatus 10 receives the network communication during the power saving state, the sub system 200 responds to the communication to be substituted by the sub system 200 instead of the main system so that the main system does not recover. Meanwhile there are types of communication which the sub system 200 does not properly finish processing. In this case, the main system 110 recovers from the power saving state. However in network communication judged to need processing by main system 110, there is a subdivided kind of communication. There are various kinds of communications for which an appropriate response is one packet, and other communications which have a big load and generate frequent packet switching such as print and web browsing. The former communications having a small load tend to occur sporadically for quantity of small data, for a short time. The latter communications with a big load tend to occur for large quantities of data, an intermittent continuation for a relatively long period of time. In the case in which the latter communication is received, the user operation and the communications are monitored for a long time for determining whether to shift to the STR state. On the other hand, monitoring for a short term is sufficient for the former communications for which the load is small. Thus in the power saving control according to this embodiment when the main system 110 recovers from a power saving mode, the re-transition condition for shifting to the power saving state again is changed depending on the kind of network communication so that the time when there is a regular power mode, after the power saving mode, is shortened. For example, a state of a machine can remain in the re-transition condition which is power on after power saving for a threshold, after the main system recovery such as for example "passing after recovery for 10 minutes". When the main system recovers, the network control management unit 192 according to this embodiment sets a re-transition condition (for example, time) for shifting to the power saving state again depending on the type of network communication which caused the recovery.

Further the network control management unit 192 sets the re-transition condition depending on whether the type of the communication can be replied only with the network control service (NCS) to control the network of the main system 142. In the case in which the kind of the communication can be replied only with the network control service (NCS), the network control management unit 192 set the re-transition condition as a condition (for example, the time is short) that is easy to change again, as compared with the case in which the kind of the communication can not be replied only with the network control service (NCS). Further the network control management unit 192 determines whether the kind of the network communication needs data processing by the application 170-180 of the main system 110. In the case in which the kind of the network communication needs data processing by the application 170-180 of the main system 110, the network control management unit 192 set the re-transition condition as a condition (for example, the time is long) that is difficult to shift or suspend again (e.g., the apparatus stays in an active state, non-suspend mode, for a longer period of time) in comparison with in the case in which the kind of the communication does not need data processing by the application 170-180 of the main system 110. The re-transition condition or re-transition threshold is preferably the lapse of time, although other conditions besides time are possible. Further the network control management unit 192 comprises a setting unit according to this embodiment.

Figure 5:
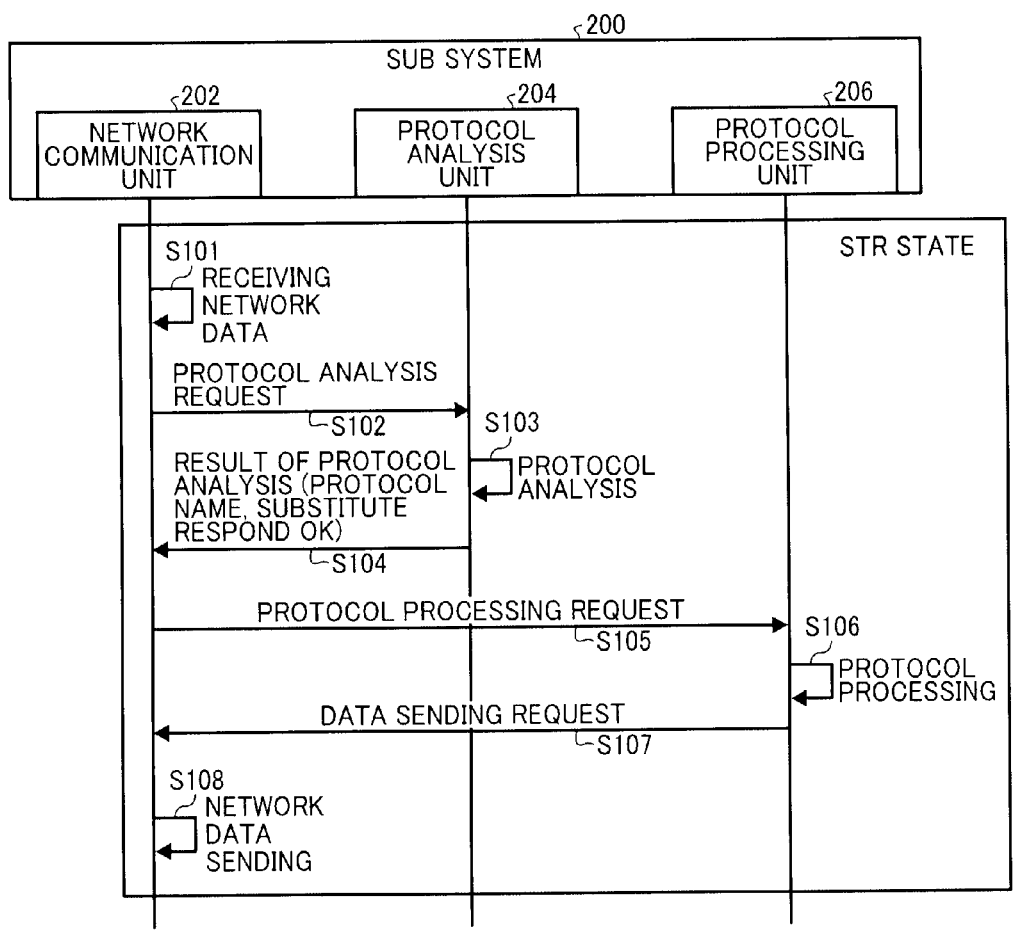
FIG. 5 is a sequence diagram illustrating a process of a substitute response executed by the sub system.

The substitute respond by the sub system 200 will be described below with reference to FIG. 5. FIG. 5 is a sequence diagram illustrating a process of substitute respond executed by the sub system. The process illustrated in FIG. 5 begins in step S101 from the stage that the image forming apparatus 10 has already shifted to the STR (suspend to random access memory) state. In step S101, the network communication unit 202 receives the network data via the NIC 32 and so on. In step S102, the network communication unit 202 requests to the protocol analysis unit 204 a protocol analysis. In step S103, the protocol analysis unit 204 executes the protocol analysis on the network data for which the protocol analysis is requested.

FIG. 7(A) is a diagram illustrating a protocol list which can be processed by the sub system in place of processing by the main system. The protocol list which can be processed by the sub system in substitution is registered in the protocol analysis unit 204 by the main system 110. In the example illustrated in FIG. 7(A), the kinds of protocols or communications which do not need processing of the upper layer such as the application layer 120, are protocols such as EchoRequest in ICMP (Internet Control Message Protocol) or ICMPv6 (Internet Control Message Protocol Version 6) and GetRequest of SNMP which is transmitted in ARP (Address Resolution Protocol), Windows (a registered trademark) XP and Windows (a registered trademark) Vista are registered.

In step S104, the protocol analysis unit 204 sends the result of the protocol analysis to the network communication unit 202 as a response to the protocol analysis request. The result of the protocol analysis includes a protocol name specified from the network data and a value which indicates that whether the sub system 200 can execute the substitute response. Further, in the example illustrated in FIG. 5, the case that does not have to make the main system recover from the STR state and the sub system 200 can executes the substitute response is illustrated. In step S105, the network communication unit 202 requests protocol processing to the protocol processing unit 206 corresponding to the specified protocol. In step S106, the protocol processing unit 206 corresponding to the specified protocol executes the protocol processing. In step S107, the protocol processing unit 206 requests a data sending to the network communication unit 202 as a result of the protocol processing. In step S108 the network communication unit 202 sends a result in response to the request.

As described above with reference to FIG. 5, in the image forming apparatus 10 according to this embodiment, the sub system 200 responds to the network communication which can be processed by the sub system 200 instead of the main system. Thus, the efficiency of power saving is improved.

Figure 6:
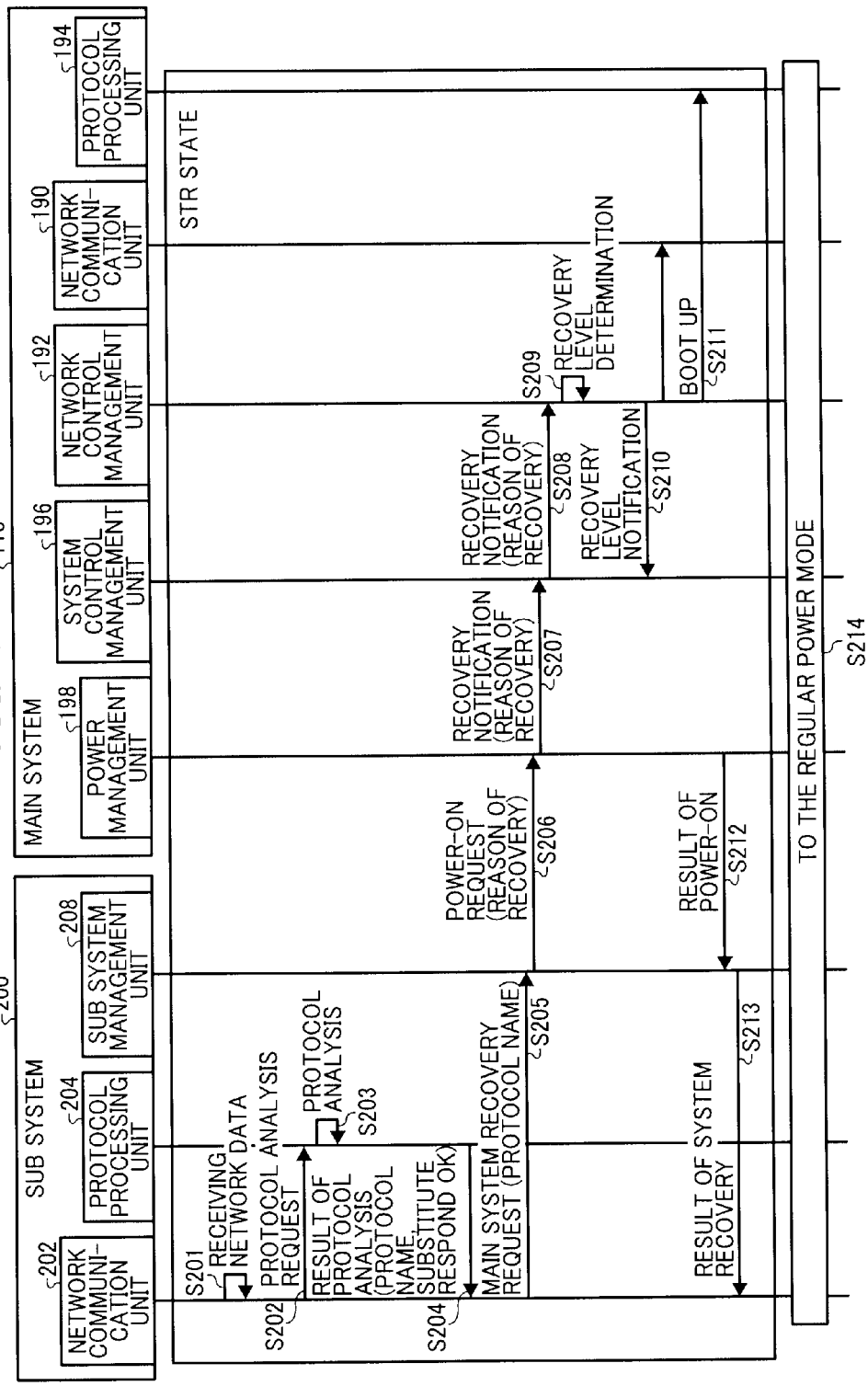
FIG. 6 is a sequence diagram illustrating a recovery process for changing a re-transition condition depending on the kind of network communication executed by the image forming apparatus.

The power saving control changing a re-transition condition for returning to the power saving state depending on the kind of the network communication will be described below with reference to FIG. 6. FIG. 6 is a sequence diagram illustrating a recovery process for changing a re-transition condition depending on the kind of network communication executed by the image forming apparatus according to this embodiment. The process illustrated in FIG. 6 begins in step S201 from the stage that the image forming apparatus 10 has already shifted to the STR state. In step S201, the network communication unit 202 receives the network data. In step S202, the network communication unit 202 requests a protocol analysis to the protocol analysis unit 204. In step S203, the protocol analysis unit 204 executes the protocol analysis of the network data. In step S204, the protocol analysis unit 204 responds with the result of the protocol analysis to the network communication unit 202. Further in the example illustrated in FIG. 6, the case in which the main system recovers from the STR state and the sub system 200 cannot execute the substitute response (for the main system) is illustrated.

In step S205, the network communication unit 202 sends the protocol name and boot requests to the sub system management unit 208. The boot request is utilized to ultimately boot up, turn on, or wake up the main system. In step S206, the sub system management unit 208 communicates with the main system 110, and sends notification which indicates the recovery reason and power-on request to the power management unit 198 of the system control service (SCS) 158. The recovery reason is information related to recovery from or exiting the suspend mode and can be the protocol name that the protocol analysis unit 204 specified and information which indicates the kind or type of the network communication. The recovery reason also can be information that is subdivided more or more detailed or specific than the protocol name. In step S207, the power management unit 198 in the main system 110 executes the recovery process according to the main system 110 and sends a recovery notification to the system control management unit 196. In step S208, the system control management unit 196 sends the recovery notification to the network control management unit 192. The recovery notification includes the recovery reason.

In step S209, the network control management unit 192 determines a recovery level based on the recovery reason. The recovery level is a level defined for setting the re-transition condition (time) depending on the kind of network communication corresponding to the recovery reason. See e.g., FIG. 7(C) which shows three exemplary conditions used for determining the recovery level. In this specification, a small recovery level corresponding to a short period of time indicates that the image forming apparatus 10 can switch to the power saving state easily and/or quickly. As the return level or recovery level rises, the re-transition condition or threshold (e.g., period of time) becomes severe (longer). The maximum level corresponds to a normal condition to initially transition (not re-transition) to the power saving state.

FIG. 7(B) and FIG. 7(C) illustrate data structures for determining the recovery level (e.g., period of time). FIG. 7(B) indicates whether the network control service 142 in the main system 110 should execute or not, and whether the application 170-180 should execute or not, corresponding to the kind of the network communication. FIG. 7(C) is a data structure or table which indicates the recovery level corresponding to a combination of the necessity of processing in NCS and the necessity of processing in the application. In addition, the "new communication/operation occurs" field described in FIG. 7(C) is used by change processing of the recovery level. Further, it is assumed that it is "No" in step S209. Further, "re-transition condition" field indicates the re-transition condition corresponding to the recovery level.

The network control management unit 192 according to this embodiment determines the recovery level based on the kind of the network communication by using the data structures illustrated in FIG. 7(B) and FIG. 7(C). The data structures illustrated in FIG. 7(B) and FIG. 7(C) are registered in advance by an administrator with a system setting screen through the operation panel 50. The data structures in FIG. 7(B) and FIG. 7(C) are examples, and various data structures which include the recovery level corresponding to the kind of communication can be used. The kind of the network communication registered are protocols which need to communicate with the application layer 120 such as a printing job, SNMP, a scanner job, a fax job, file transport, and apparatus management protocols such as the network peripheral management protocol (NPMP).

In step S210, the network control management unit 192 sends the recovery level to the system control management unit 196 which controls the transition to the power saving state and for setting the recovery level. When the system control management unit 196 receives the recovery level, the system control management unit 196 stores the recovery level and/or re-transition condition or threshold (e.g., a period of time) corresponding to the recovery level. It is to be noted that while the invention is disclosed in terms of determining a recovery level which is then used to determine the re-transition condition or threshold (e.g., a predetermined period of time) the invention also includes directly determining the re-transition threshold or condition (e.g., the time period) directly without determining a separate recovery level. In step S211, the network control management unit 192 boots up or starts the network communication unit 190 and the protocol processing unit 194 for packet processing. In step S212, the power management unit 198 communicates with the sub system 200, and sends a notification indicating that the power is supplied to the sub system management unit 208. In step S213, the sub system management unit 208 sends a notification indicating the main system has recovered to the network communication unit 202. After step S214, the image forming apparatus 10 is in the regular power state.

Figure 8:
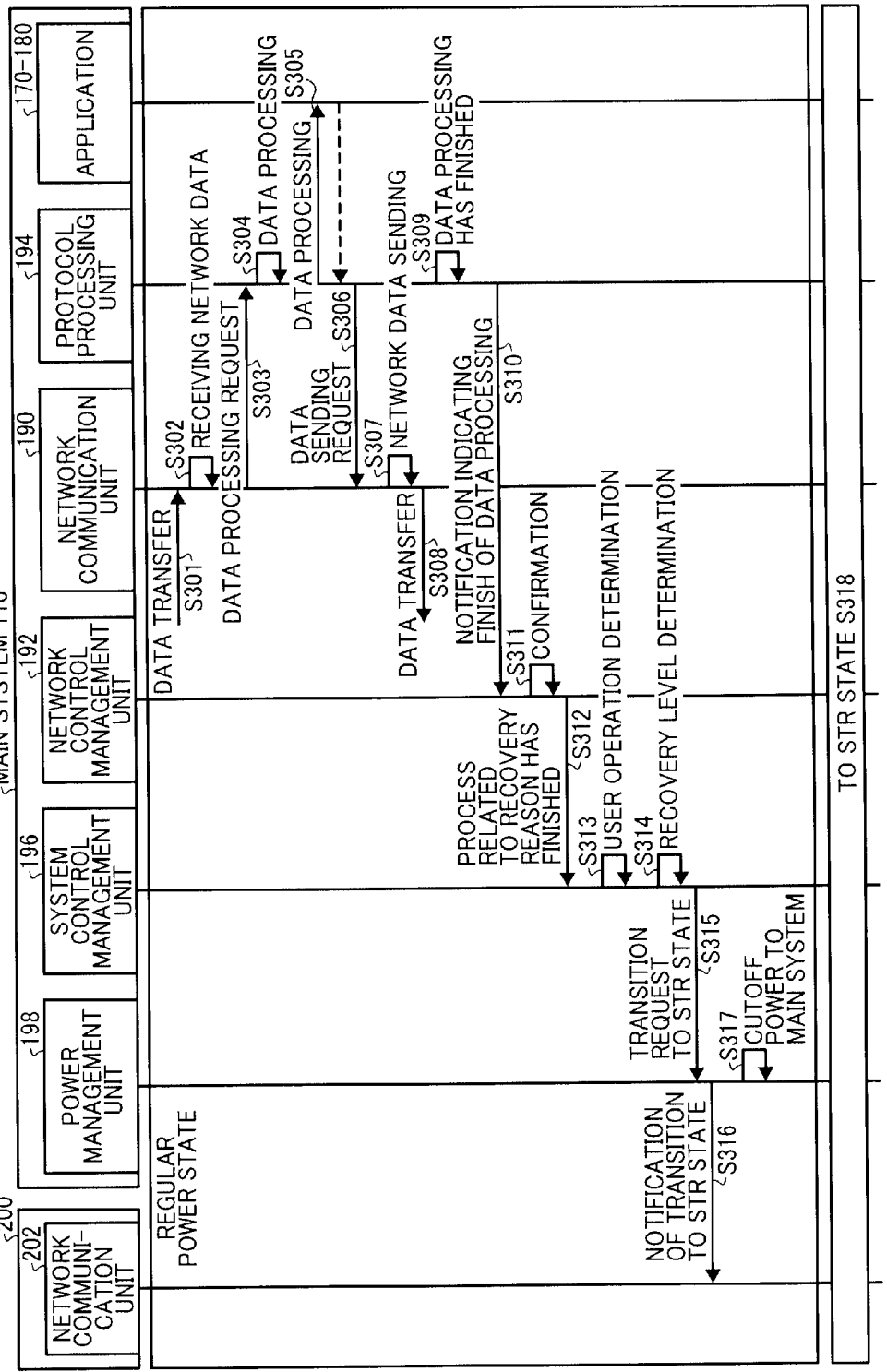
FIG. 8 is a sequence diagram illustrating a process of re-transition executed by the image forming apparatus according to this embodiment after changing the re-transition condition depending on the kind of network communication.

With reference to FIG. 8, a process of re-transitioning from the suspend mode after changing the re-transition condition depending on the kind of network communication is described below.

FIG. 8 is a sequence diagram illustrating a process of re-transition after waking from the suspend mode executed by the image forming apparatus according to this embodiment after changing the re-transition condition depending on the kind of network communication. An example shown in FIG. 8 is begun in step S301 from a stage after having been in the regular power state by the process of step S214 shown in FIG. 6. In step S301, the network communication unit 190 receives the network data that causes the recovery from the suspend mode. In step S302, the network communication unit 190 executes receiving processing of the network data. In step S303, the network communication unit 190 requests data processing to the proper protocol processing unit 194.

In step S304, the protocol processing unit 194 executes data processing to the network data which is requested to be processed. The case that the kind of the network communication needs to be processed by the application 170-180 is illustrated in FIG. 8. In step S305, the protocol processing unit 194 requests the data processing to the application 170-180 and receives a result of the data processing. In step S306, the protocol processing unit 194 requests data sending to the network communication unit 190. In step S307, the network communication unit 190 executes network data sending against the received data. In step S308, data is sent in response to the communication which became the reason of the recovery. In step S309, the protocol processing unit 194 determines that a response to network communication which became the reason of the recovery has finished. In step S310, the protocol processing unit 194 sends a notification indicating that the data processing has finished to the network control management unit 192.

The network control management unit 192 confirms in step S311 that another network communication does not occur. In step S312, the network control management unit 192 sends a notification indicating that a process to the communication which became the reason for recovery has finished to the system control management unit 196. Another network communication other than the network communication which became the reason of the recovery is out bound communication in order to actively send data from the image forming apparatus 10 to network 62. When such an active network communication occurs, because the image forming apparatus 10 is not idle, it is not appropriate to make the image forming apparatus 10 promptly switch to the power saving state. In this embodiment, the network control management unit 192 sends a notification indicating that the active network communication occurs with the notification indicating that a process to the communication which became the reason for recovery has finished to the system control management unit 196. In this case, the re-transition condition is not maintained, and the recovery level is set to the maximum. The ordinary transition condition is applied. In step S313, the system control management unit 196 determines whether the user operation is executed. Because the user operation is being performed as opposed to the image forming apparatus 10, the image forming apparatus 10 is operating. So it is not appropriate to make the image forming apparatus 10 switch to the power saving state immediately. In the case in which the system control management unit 196 receives notification from the operation panel control service (OCS) 146 and determines that the user operation is being executed, the system control management unit 196 does not maintain the re-transition condition corresponding to the recovery level determined in step S209 illustrated in FIG. 6.

The system control management unit 196 changes the recovery level to the maximum and applies the ordinary transition condition. In the case in which the system control management unit 196 determines that the user operation is not being executed, the system control management unit 196 maintains the re-transition condition corresponding to the recovery level determined in step S209 illustrated in FIG. 6.

After the system control management unit 196 determines that the user operation is not being executed, the system control management unit 196 confirms the recovery level set currently, and waits until the re-transition condition corresponding to the recovery level is satisfied in step S314. In the case in which the recovery level determined in step S209 illustrated in FIG. 6 has not changed, the re-transition condition corresponding to the kind of the network communication is applied. In the case in which the recovery level set in step S311 or S313 illustrated in FIG. 8, the ordinary transition condition is applied. In the case in which the user operation or new out bound communication does not occur until the transition condition is satisfied, the system control management unit 196 requests the transition to the STR state to the power management unit 198 in step S315.

In step S316, the power management unit 198 communicates with the sub system 200, and the power management unit 198 sends notification indicating transition to the STR state to the network communication unit 202. In step S317, after a software component of the main system 110 finishes shut down, the power management unit 198 orders the power supply unit (PSU) to cutoff the power to the component to be cut off in the power in power saving mode. In step S318, the image forming apparatus 10 switches to the power saving state. As described above, even if the main system 110 needs to recover, because the recovery level and the re-transition condition can be set depending on the kind of the network communication which became the reason of the recovery, the time of a regular power state is shortened and power saving efficiency is improved.

The power saving control to adequately change a re-transition condition depending on an event to occur after recovery will be described below.

Figure 9:
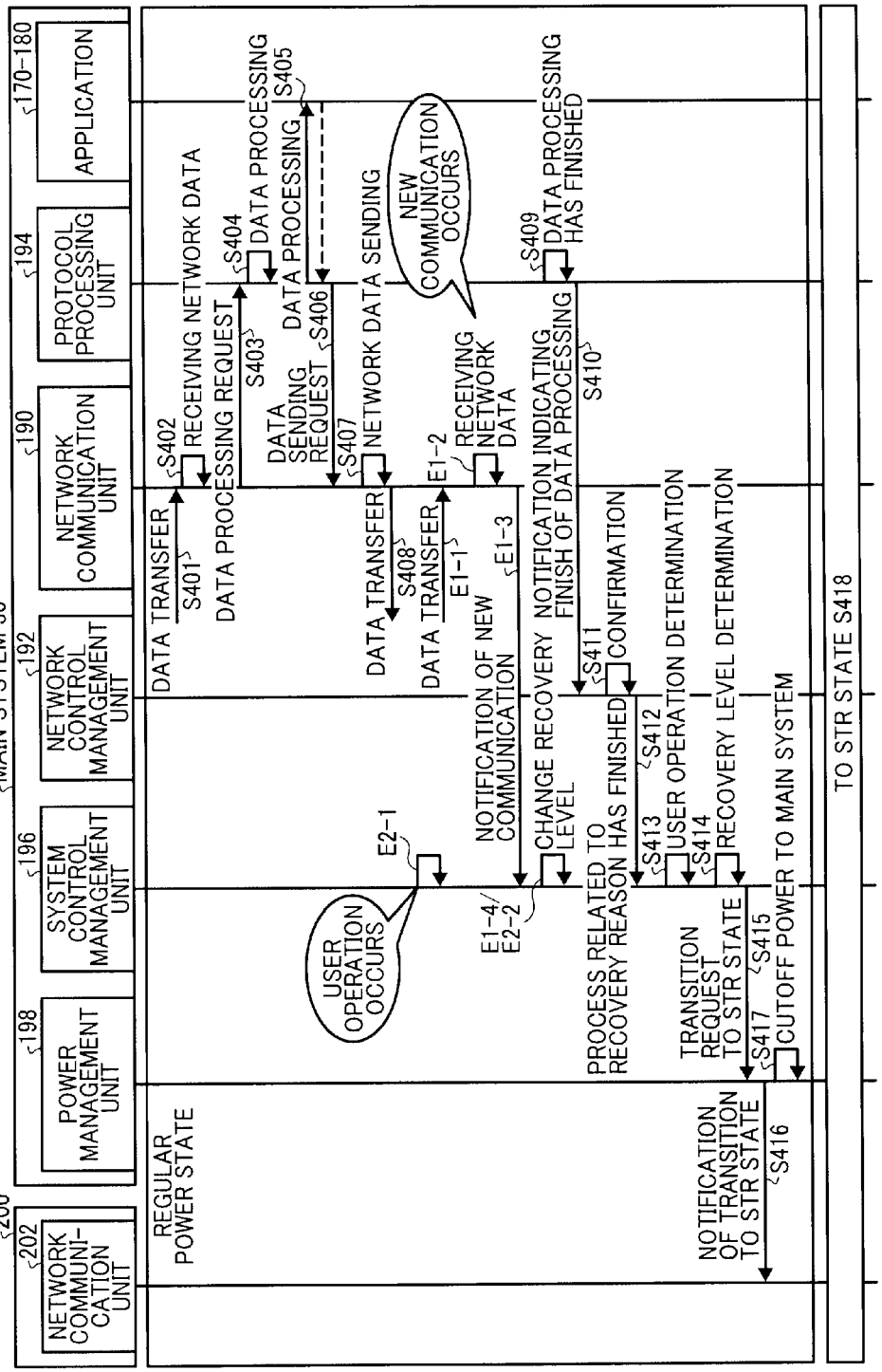
FIG. 9 is a diagram illustrating a process of re-transition executed by the image forming apparatus according to another embodiment after changing the re-transition condition depending on the kind of network communication.

FIG. 9 is a diagram illustrating a process of the re-transition executed by the image forming apparatus according to another embodiment, after changing the re-transition condition depending on the kind of network communication. FIG. 9 begins with step S401 from a stage after having been in the regular power state by the process of step S214 shown in FIG. 6. In step S401, the network communication unit 190 receives the network data which became to the reason of the recovery. In step S402, the network communication unit 190 executes receiving processing. In step S403 the network communication unit 190 requests the data processing to the proper protocol processing unit 194. The protocol processing unit 194 executes the data processing to the network data requested in step S404. In step S405, if necessary, the protocol processing unit 194 requests the data processing to the application 170-180 and receives a result of the data processing. In step S406, the protocol processing unit 194 requests the sending of data to the network communication unit 190. In step S407, the network communication unit 190 executes the network data sending processing. In steps S408 the data is sent.

Figure 10:
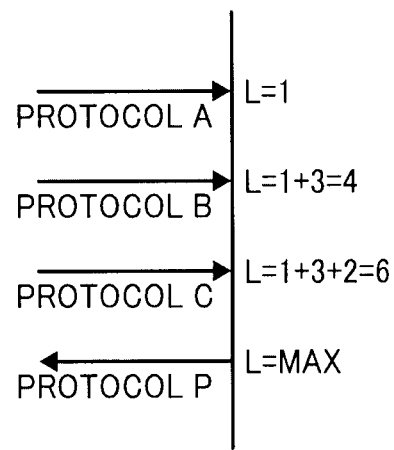
FIG. 10 is a diagram illustrating a process of building up the recovery level whenever communication by a protocol of a return reason occurs.

In the example illustrated in FIG. 9, while processing is performed regarding the communication which became the reason for the recovery, an event occurs and the recovery level is changed depending on the event. For example, the case that another communication corresponding to the reason of the recovery occurs as event E1-1 will be described. When the network communication unit 190 receives data transfer of the network communication, the network communication unit 190 executes the network data receiving processing and other responding processing in step E1-2. In step E1-3, the network communication unit 190 sends a notification indicating that a new communication occurs to the system control management unit 196. The image forming apparatus 10 performs a judgment of the re-transition because the network communication occurs. So the system control management unit 196 raises the recovery level every new communication event step by step in step E1-4. For increasing the recovery level, it is raised by one phase, and the recovery level corresponding to every protocol of the recovery reason can be stacked or raised up as shown in FIG. 10, for example, which is one possible implementation. In addition, in FIG. 10, a value corresponding to each protocol is added to the recovery level. Further, as event E2-1, in the case in which the system control management unit 196 detects the user operation is being processed by receiving the notification sent from the operation panel control service (OCS) 146, a judgment of the re-transition may be performed with a more restrictive criteria. Thus, the system control management unit 196 changes the recovery level step by step by raising one step recovery level every user operation event in step E2-2.

In step S409 the protocol processing unit 194 finishes processing the network communication which became the reason of the recovery. In step S410, the protocol processing unit 194 reports a completion of the data processing to the network control management unit 192.

In step S411, the network control management unit 192 confirms the network communication other than the network communication which became the reason of the recovery does not occur. A new communication to promote a change of the recovery level is communicated, received by the image forming apparatus 10, and related to another reason of the recovery. Meanwhile, when the communication is an outbound communication executed by the image forming apparatus 10, there is no confirmation. When network communication except the communication which became the reason of the recovery occurs, as described with respect to FIG. 8, the recovery level is set to the maximum, and an ordinary transition condition or threshold is applied which is typically the maximum time. In step S411, it is confirmed that the network communication except the communication which became the reason of the recovery does not occur. In step S412, the network control management unit 192 sends notification indicating that the processing to the communication which became the reason of the recovery has been finished to the system control management unit 196.

Further the system control management unit 196 determines whether the user operation occurs in step S413. In the case in which the system control management unit 196 determines the user operation does not occur, the system control management unit 196 confirms the recovery level which is set currently and waits until the re-transition condition corresponding to the recovery level is satisfied. If there is not a change to the recovery level judged to be in step S209 illustrated in FIG. 6, the re-transition condition corresponding to the kind of the network communication is confirmed. If the recovery level is changed in the step E1-4 or E2-2 in response to the event and the recovery level is set to the maximum in step S411 or S413, the re-transition condition corresponding to the recovery level is applied. In the case in which the user operation or another new outbound communication does not occur, in step S415, the system control management unit 196 requests the power management unit 198 to switch to the STR state. In step S416, the power management unit 198 sends notification indicating the transition to the STR state to the network communication unit 202. In step S417, the power supply to the component which responds to the power saving mode of the main system 110 is cut off. In step S418 the image forming apparatus 10 switches to the power saving state again.

Figure 11:
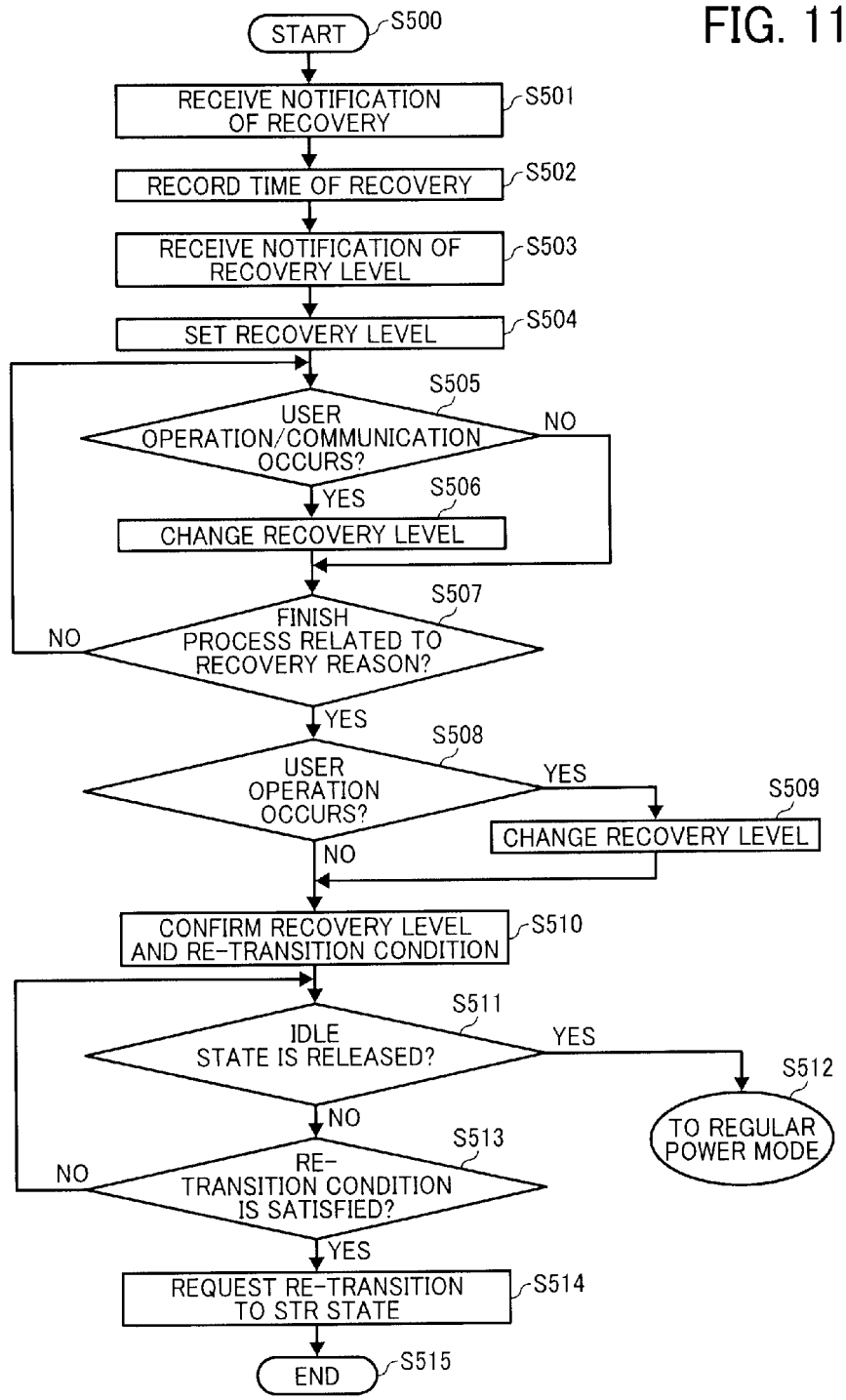
FIG. 11 is a flowchart illustrating a power saving control process executed by system control management unit according to this embodiment.

FIG. 11 is a flowchart illustrating a power saving control process executed by the system control management unit according to this embodiment. The process illustrated in FIG. 11 is begun in step S500 in response to the recovery of the main system 110 from a suspend state. In step S501, the system control management unit 196 receives the recovery notification from the sub system 200 via the power management unit 198 and sends the recovery notification to the network control management unit 192. In step S502, the system control management unit 196 records the time of recovery. In step S503, the system control management unit 196 receives the notification of the recovery level from the network control management unit 192. In step S504, the network control management unit 192 sets and stores the received recovery level.

In step S505, the system control management unit 196 determines whether the user operation or the event of new communication occurs which are events which cause a recovery from the suspend mode. In the case in which the system control management unit 196 determines that the user operation event occurs in response to the notification received from the operation panel control service (OCS) 146 or determines that the new communication event occurs in response to the notification received from the network control service 142 (YES in step S505), flow proceeds to step S506. In step S506, the system control management unit 196 changes the recovery level step by step, and flow proceeds to step S507. The recovery level can be increased to the maximum corresponding to the ordinary transition condition which initially causes the suspend mode step by step. Meanwhile, in the case in which the system control management unit 196 determines that the user operation event does not occur and determines that the new communication event does not occur (NO in step S505), flow directly proceeds to step S507.

In step S507, the network control management unit 192 detects a receiving of the notification indicating processing related to the recovery reason is finished. In the case in which the network control management unit 192 does not detect the receiving of the notification in step S507 (No), flow proceeds back to step S505 and waits for the finish of the processing related to the recovery reason. Meanwhile, in the case in which the network control management unit 192 detects the receiving of the notification in step S507 (YES), flow proceeds to step S508. In step S508, the system control management unit 196 determines whether the user operation occurs. In the case in which the system control management unit 196 determines in step S508 that the user operation occurs (YES), flow proceeds to step S509. In step S509, the recovery level is changed to the maximum, the ordinary transition condition from the suspend state is applied, and flow proceeds to step S510. In the case in which the system control management unit 196 determines, in step S508, that the user operation does not occur, flow proceeds to step S510.

In step S510, the system control management unit 196 confirms the current recovery level and/or the re-transition condition or threshold corresponding to the current recovery level. In step S511, the system control management unit 196 monitors whether the re-transition condition is satisfied and determines whether the idle state is released. In the case in which, in step S511, the system control management unit 196 determines that the idle state is released (YES), flow proceeds to the step S512 and the apparatus is switched to the ordinary state in which the ordinary transition condition is applied. Meanwhile in the case in which, in step S511, the system control management unit 196 determines that the idle state is not released (NO), flow proceeds to the step S513.

In step S513, the system control management unit 196 measures the elapse of time from the registered time of recovery, determines whether the re-transition condition is satisfied, and until the re-transition condition is satisfied, proceeds back to step S505. When the system control management unit 196 determines that the re-transition condition or threshold (e.g., elapse of time) is satisfied in step S513 (YES), flow proceeds to step S514. In step S514, the system control management unit 196 requests the re-transition to the power saving state (STR state) to the power management unit 198, and the process is finished in step S515.

According to one embodiment, in the image forming apparatus 10 including the main system 110 and the sub system 200, the re-transition condition or threshold (e.g., a time period) is set depending on the kind of the network communication which causes the main system 110 to recover from the suspend state. This permits a ratio of the time in the power saving state to be big in comparison with the case that the re-transition to the suspend state is set uniformly without regard to the type of the network communication. Thus efficient power saving control is realized.

As described above, in the embodiment, it can be provided that the image processing apparatus, power saving control method, storage medium which can improve the power saving efficiency by setting the re-transition condition depending on the kind of the network communication and making the ratio of the time in the power saving state big, in the case in which a network communication causes the main system to recover from the power saving state.

Further the image processing apparatus is not limited to the image forming apparatus 10 described in the embodiment, but is equally applicable to any information processing apparatus or computerized system. The image forming apparatus 10 includes any desired image forming apparatus such as a printer, a copy apparatus, an image reading apparatus, such as a scanner, image communication apparatus such as fax. This invention is applied to any apparatus providing image processing or information processing functions.

Each function (process) in this embodiment is realized with programs described with program language such as C, C++, C#, Java (registered trademark), although other types of program languages may be used. The program can be stored in a machine readable storage medium such as a hard disc apparatus, CD-ROM, MO, DVD, or a semiconductor based memory, for example, and can be downloaded via a network. Further, the present invention is not limited to the above-described embodiments, and variations and modifications may be made without departing from the basic concepts of the present invention as claimed.

What is claimed is:

1. An information processing apparatus, comprising:
a sub system that, while a main system is in power saving state, analyzes a protocol of a network communication and recovers the main system to an ordinary power mode from the power saving state, in accordance with the protocol;
a processor to set a timing of re-transition to the power saving state, depending on a kind of the network communication and depending on which one of at least three recovery levels was executed when the main system recovered from the power saving state;
a controller that monitors whether the timing of the re-transition to the power saving state is satisfied and switches the main system to the power saving state in response to the timing of the re-transition being satisfied.

2. The information processing apparatus as claimed in claim 1, wherein:
the controller sets the timing of the re-transition to the power saving state to be shorter than a previous timing.

3. The information processing apparatus as claimed in claim 2, wherein:
the controller sets the timing of the re-transition to the power saving state to be longer than a previous timing.

4. The information processing apparatus as claimed in claim 1, wherein:
the controller raises a recovery level every user operation event or every new communication event during processing of the communications which became a reason of the recovery of the main system, the timing of the re-transition to the power saving state being longer than a previous timing.

5. The information processing apparatus as claimed in claim 1, wherein:
the controller raises, in the case that a user operation is being executed when the processing of a communication which became a reason of the recovery of the main system finishes, the timing of the re-transition to be a maximum timing which is an ordinary transition condition.

6. A power saving control method in an information processing apparatus which includes a sub system which operates while a main system is in a power saving state, the method comprising:
recovering, in response to a network communication, the main system from the power saving state;
setting a timing of re-transition to the power saving state which causes the main system to switch to the power saving state again, depending on a type of the network communication which caused the recovery of the main system and depending on which one of at least three recovery levels was executed when the main system recovered from the power saving state;
determining whether the timing of the re-transition is satisfied;
switching the main system to the power saving state, when the determining determines that the timing of the re-transition is satisfied.

7. A non-transitory computer readable storage medium storing instructions that, when executed by a computer, perform the power saving control method according to claim 6.

* * * * *